UNITED STATES PATENT OFFICE.

BERTHOLD SINGER, OF CHICAGO, ILLINOIS, ASSIGNOR TO THE PEROLIN COMPANY OF AMERICA, OF CHICAGO, ILLINOIS, A CORPORATION OF ILLINOIS.

SWEEPING COMPOUND.

No. 867,538.

Specification of Letters Patent.

Patented Oct. 1, 1907.

Application filed August 1, 1906. Serial No. 328,736.

*To all whom it may concern:*

Be it known that I, BERTHOLD SINGER, a citizen of the United States, residing at Chicago, in the county of Cook and State of Illinois, have invented certain new and useful Improvements in Sweeping Compounds, of which the following is a full, clear, and exact specification.

This invention relates to a composition or compound, and process of making the same, designed to be placed upon the floor preparatory to and during sweeping, for collecting or laying the dust, and it has for its object to provide a granular form of material for this purpose in which each individual granule or particle shall contain within itself a quantity of dust-absorbing or collecting substances so held by the said particles as to remain moist practically indefinitely.

With a view to the attainment of these ends, and the accomplishment of certain other objects which will hereinafter appear, the invention consists in the features of novelty which will now be more specifically described and pointed out in the claims.

In carrying out my invention, I employ a suitable body material comprising small particles or granules, each individual granule of which possesses pores, so as to be capable of absorbing a liquid, as contradistinguished from merely carrying a portion of the liquid on its exterior, and these particles or granules I thoroughly impregnate or saturate with a resinous material in proportion sufficient to fully laden each particle without having any free liquid, so that the resultant product will be a granular mass, or mass of detached, separated particles, each containing within itself a quantity of the resinous liquid, and being capable of rolling freely upon the floor, or other surface, and bringing all of its sides into contact with the dust particles, which adhere to the resinous material by reason of their moist and viscous surfaces, which are retained in this moist condition practically indefinitely, and the moisture of the surface thereof replenished by the more liquid form of the resinous material contained further within the pores of the granule or body-particle.

As a suitable porous granule, or comminuted body-substance, I employ saw-dust, comminuted slag, or other like material, but preferably saw-dust, because of its cheapness, its porous nature, and its cleaning properties; and for the resinous material, I employ any resinous material and water, but preferably hard resin. To about one pound of resin, I add 25 pounds of water, the resin being dissolved by a medium, preferably consisting of lye or potash, and by the aid of steam or other suitable heat, and after the resin is thoroughly dissolved, making a solution of resinous material. While the liquid is still at a high degree of heat, I add thereto about 15 pounds of saw-dust, or a sufficient amount to entirely absorb all the liquid and at the same time thoroughly saturate all particles of the saw-dust without leaving the mass mushy or wet. The saw-dust being introduced preferably while the liquid is hot, it readily receives the liquid into its pores, and when it is allowed to cool, the liquid assumes a jelly-like form, which is more or less firm on the outside but of a more liquid consistency further within the pores, so that the exterior portion continually draws moisture from the interior in sufficient quantity to keep the exterior in that semi-moist condition necessary for collecting or laying the particles of dust with which it comes in contact during the sweeping operation. A sweeping compound composed of these ingredients will lay and collect the dust without staining the floor or carpet.

The efficiency of the material thus described may be considerably enhanced by the addition thereto of a quantity of sand, which serves the two-fold purpose of cutting the particles of saw-dust apart, avoiding the possibility of the granules hanging together *en masse*, and securing the scouring properties of the sand itself. With the proportions before mentioned, 40 pounds of sand may be employed.

What I claim and desire to secure by Letters Patent, is:—

1. The herein-described composition of matter containing separate or detached granules or particles, individually porous, and a solution of a resinous compound with which the individual pores are impregnated, all in a mass of detached granules.

2. A composition of matter for the purpose specified comprising sawdust, a resinous material, and a silicious material, said mixture being adapted to absorb dust, substantially as described.

3. The herein-described composition of matter containing saw-dust saturated with resin soap in a mass of detached granules.

3. The herein-described composition of matter containing absorbent granules, each individually porous, a solution of resin soap with which the individual pores of said granules are impregnated, a granulated material mixed therewith for separating said granules, all in a state of free detached granules.

5. The herein-described composition of matter containing individually-porous granules, a resin soap with which the said granules are impregnated, and sand intermingled therewith.

6. The herein-described method for the manufacture of a sweeping compound, which consists in producing a resin soap and introducing thereinto a quantity of absorbent granules until all of the free liquid is absorbed.

7. The herein-described process of manufacturing a sweeping compound, which consists in producing a hot solution of a resinous compound, and introducing thereinto while hot a quantity of absorbent granules sufficient to absorb all of the liquid.

8. The herein described process of manufacturing a sweeping compound, which consists in producing a solution of resin soap, and introducing into the solution while hot a quantity of saw-dust to absorb the free liquid.

In testimony whereof I affix my signature in presence of two witnesses.

BERTHOLD SINGER.

Witnesses:
Z. WALDMAN,
C. HEYMANN.